S. WEIMER.
TRANSMISSION GEARS FOR AUTOMOBILE.
APPLICATION FILED MAY 24, 1917.

1,259,691.

Patented Mar. 19, 1918.

Inventor
Samuel Weimer
By
his Attorney

UNITED STATES PATENT OFFICE.

SAMUEL WEIMER, OF CARSON, OREGON.

TRANSMISSION-GEARS FOR AUTOMOBILES.

1,259,691.  Specification of Letters Patent.  Patented Mar. 19, 1918.

Application filed May 24, 1917. Serial No. 170,711.

*To all whom it may concern:*

Be it known that I, SAMUEL WEIMER, a citizen of the United States, residing at Carson, county of Baker, and State of Oregon, have invented certain new and useful Improvements in Transmission-Gears for Automobiles, of which the following is a specification.

This invention relates to transmissions for automobiles.

The object of my invention is the provision of an improved transmission gearing, particularly designed for use on the well known Ford car, whereby provision is made for extreme low, low, intermediate, and high speeds and, also, an additional backward speed is obtained.

An embodiment of the invention is hereinafter set forth and the novel features thereof are recited in the appended claims.

Figure 1:
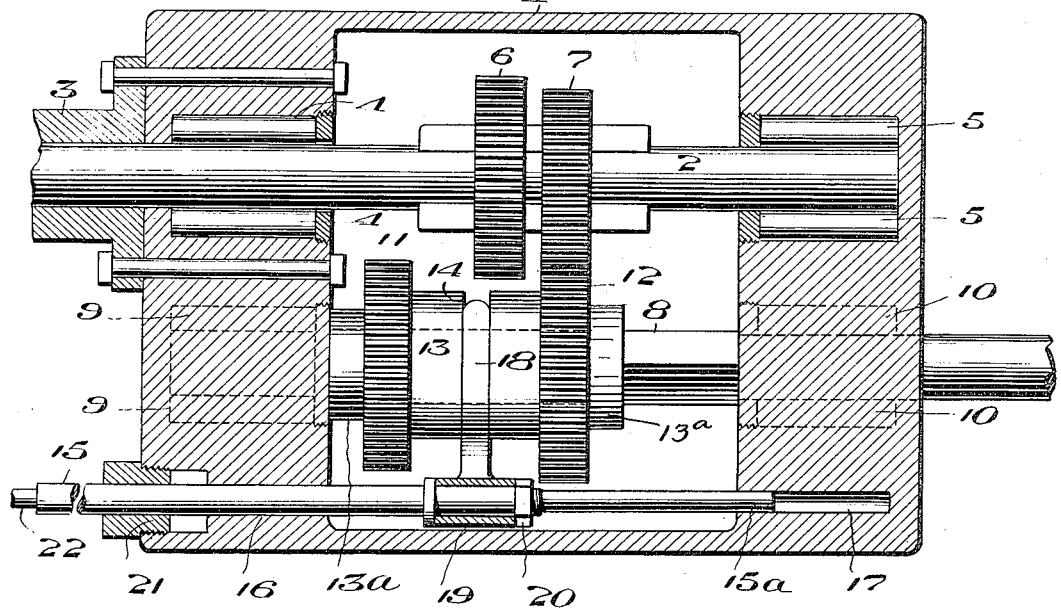

In the accompanying drawings:

Figure 1 is a horizontal section showing the gears in "low"; and

Figure 2:
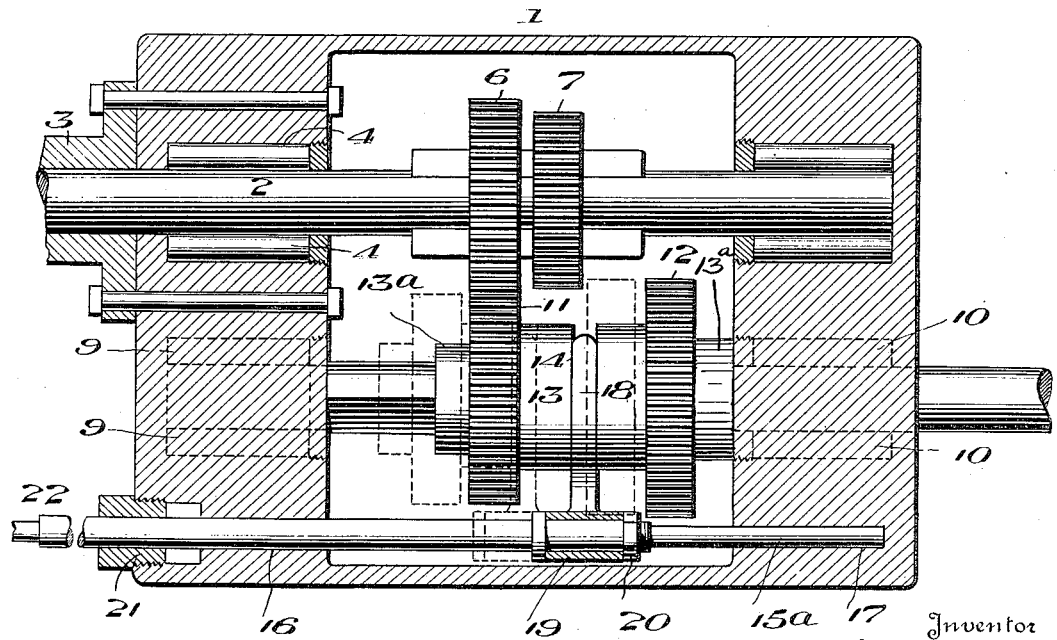

Fig. 2 a similar view, full lines showing the gears in "high" and dotted lines representing them in "neutral."

The casing 1 carries the transmission. The engine shaft 2 is located within the tubing 3 and supported by roller bearings 4, 5, carried by the casing 1. Gears 6, 7, of different diameters, say, three and one half inches and three inches respectively, are keyed to the shaft 2.

A square transmission shaft 8 which is journaled in roller bearings 9, 10, carries a pair of gears 11, 12, of different diameters which are slidable thereon and are connected by a hub 13 having a groove 14. The gears 11, 12, are adapted to be slid along the squared portion of the shaft 8 to bring them into mesh, one at a time, with the respective gears 6, 7, or, they may be set in the neutral position, as shown by dotted lines in Fig. 2 as they are spaced a sufficient distance apart so that they may be disposed on opposite sides of the pair of gears 6, 7. A shift bar 15 which is slidable at 16 through one portion of the casing, has its inner end 15$^a$ slidable in a concavity 17 in the other portion of the casing whereby it is guided. The hub portions 13$^a$ of the hub 13 determine the extreme limit of movement of the pair of gears 11, 12, so that when engaged with the roller bearing 9, the gears 7 and 12 are in mesh and when the other hub portion 13$^a$ is in engagement with the roller bearing 10 the gears 6 and 11 are in mesh, these positions being respectively shown in figures. The gears 11, 12 are shifted by fingers 18 carried by a collar 19 on the shift bar 15 and secured by a nut 20, the fingers being received in the groove 14. The bar 15 has a packing or gland 21 where it passes through the casing and it is operated by a shift rod 22 leading to any controlling device, not shown.

In Fig. 1 the gearing is arranged to give low speed, while the dotted arrangement of the gears shown in Fig. 2 is when they are neutral; in Fig. 2 the arrangement is for high speed.

Having thus described my invention, what I claim as new and desire to secure by Letters Patent is:—

In a transmission gearing, the combination with a casing, of antifriction bearings thereon, an engine shaft mounted in said bearings, coupled gears of different diameters fixed to the engine shaft intermediate the anti-friction bearings, other anti-friction bearings, a transmission shaft mounted therein which has a squared portion, coupled gears of different diameters slidable on the squared part of the transmission shaft between the roller bearings thereof, having a hub provided with a groove, said coupled gears last-named being limited in their sliding movements by the casing, a slidable shift bar, adapted to be operated by suitable means, and a pair of fingers carried by said shift bar which are received in the groove aforesaid.

In testimony whereof, I hereunto affix my signature.

SAMUEL WEIMER.